United States Patent [19]

Nonaka

[11] Patent Number: 5,109,420

[45] Date of Patent: Apr. 28, 1992

[54] CAR AUDIO DEVICE

[75] Inventor: Yoshiya Nonaka, Kawagoe, Japan

[73] Assignee: Pioneer Electronic Corporation, Tokyo, Japan

[21] Appl. No.: 500,618

[22] Filed: Mar. 9, 1990

[30] Foreign Application Priority Data

Aug. 4, 1989 [JP] Japan .................................. 1-202303

[51] Int. Cl.$^5$ .............................................. H04B 1/00
[52] U.S. Cl. ...................................... 381/86; 455/352; 455/151.1
[58] Field of Search ......................... 381/86, 105, 123; 358/194.1; 455/151, 352, 353, 346

[56] References Cited

U.S. PATENT DOCUMENTS

| | | | |
|---|---|---|---|
| 4,227,259 | 10/1980 | Mogi | 455/352 |
| 4,347,510 | 8/1982 | Ishigaki et al. | 381/123 |
| 4,633,514 | 12/1986 | Firnoff et al. | 455/151 |
| 4,751,581 | 6/1988 | Ishiguro et al. | 358/194.1 |

Primary Examiner—Forester W. Isen
Attorney, Agent, or Firm—Sughrue, Mion, Zinn, Macpeak & Seas

[57] ABSTRACT

A car audio device of the present invention is divided into at least two parts comprising a body part and an operational part which is detachable from the body part. The body part has a system controller, and the operational part has a key input controller for outputting an operation signal to the system controller. The body part and the operational part are detachably connected to each other by a mechanical mechanism, and the signal lines for these parts are electrically connected to each other through detachable contact terminals. The operational part has a gate part which selects the signal from either the key input controller or the remote control receiver. The signal selected is transmitted to the system controller through a common transmission line used by the key input controller and the remote control receiver in common.

2 Claims, 3 Drawing Sheets (a) SIGNAL FORMAT OF REMOTE CONTROL SIGNAL DR (b) SIGNAL FORMAT OF OPERATION COMMAND SIGNAL DK

CAR AUDIO DEVICE

BACKGROUND OF THE INVENTION

The present invention relates to a car audio device such as a car stereo device, a car radio or the like, and, more particularly, to a car audio device in a system (a so-called detachable system) in which a body part and an operational part are detachable from each other.

Each of detachable car audio devices has a configuration which is divided into two functional parts so that one of the functional parts can be fixed to the inside of a car, specifically, to the dashboard of a cockpit, and the other can be freely attached to and detached from the body unit. The fixed part is called a body part, and the detachable part is called a detachable grill (corresponding to an operational part). The body part accommodates, for example, a mechanism part such as the mechanism part of a cassette tape recorder, the mechanism part of a CD (compact disk) player and the system controller (microprocessor) of the audio device of the present invention or the like. The detachable grill has an indicator panel serving as a base onto which central functional parts such as input keys, input controllers, various displays, a display driver remote control receivers and the like are mounted or in which these parts are received. The body part and the detachable part are detachably combined by a mechanically using a lock mechanism which can be released. They are also electrically detachably connected to each other through contact terminals which are electrically connected to each other and which are provided at corresponding positions. A plurality of contact terminals are provided in correspondence with the number of signals transmitted between the two parts and include a terminal for a power line. In this way, the body part and the detachable grill can be separated from each other, and the audio device does not function as an audio device in a state wherein the detachable grill is detached from the body part. It is therefore possible to prevent robbery of the audio device by detaching and taking a way the detachable grill when the driver gets off a car.

However, the above-described conventional car audio devices has the problem that communication between the display driver and the key input controller on the side of the detachable grill and the system controller on the side of the body part is performed by a system bus, and the problem that the same system bus is also used as a control bus for a CD player in the body part. That is, the first problem causes the complication of connective relation between the detachable grill and the body unit owing to the presence of many signal lines in the system bus and thus causes the complication of connection between the contact terminals. The second problem causes the noise produced between the contact terminals when the detachable grill is attached and detached to be mixed in the audio device through the system bus, resulting in the occurrence of malfunction.

SUMMARY OF THE INVENTION

It is an object of the present invention to reduce the number of communication lines provided between a detachable grill and a body part and to prevent mulfunction from being produced by noise.

The present invention provides a car audio device comprising a body part having a system controller and an operational part which has a key input controller for outputting an operation signal to the system controller and a remote control receiver and which is detachably connected to the body part, the audio device further comprising a gate means for selectively outputting the operation signal output from either the key input controller or the remote control receiver, and a common transmission line for sending the signal output from the gate means to the system controller.

In the present invention, the gate means selectively outputs either the operation signal output from the key controller or the operation signal output from the remote control receiver. This is based on the fact that the operation signal output from the key controller and the operation signal output from the remote control receiver are different in the point that the former signal is originated from the receiver of a remote controller, but both the signals have the same function as an operation command. The operation signal selected by the gate means is transmitted to the system controller through the common transmission line. In this case, only one common transmission line may be provided if only the operation signal is transmitted therethrough, and there is no need for use of a system bus, as in conventional devices. It is therefore possible to reduce the number of signal lines and prevent the noise produced when the detachable grill is attached and detached from being mixed in the system bus because no system bus connected to an audio device part is used.

BRIEF DESCRIPTION OF THE DRAWINGS

FIG. 6(*b*) is an explanatory view of a signal format of an operation command signal.

DESCRIPTION OF THE PREFERRED EMBODIMENTS

Embodiments of the present invention are described below with reference to the drawings.

An example of conventional detachable car audio devices is first described below for the purpose of supporting the understanding of the present invention.

Figure 1:
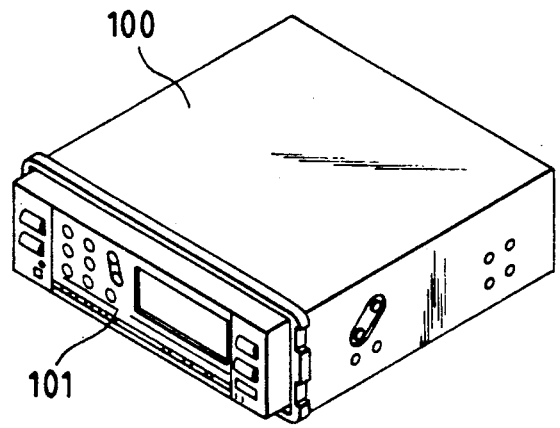
FIG. 1 is a perspective view of a detachable car audio device.
Figure 2:
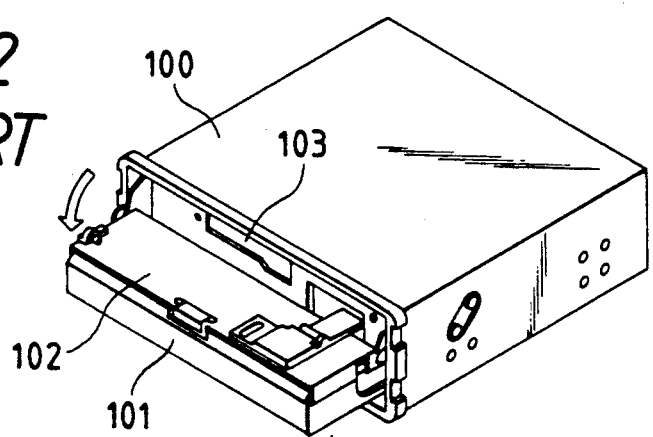
FIG. 2 is a perspective view of a detachable grill in an open state.

As shown in FIG. 1, a car audio device is roughly divided into a body part 100, which is stationarily provided on the car side, and a detachable grill 101, which is detachably mounted on the body part 100. The detachable grill 101 is supported by an inner cover 102 which is pivotally fixed on the body part 100 so that it can be opened and closed. When the detachable grill 101 is detached, the detachable grill 101 is opened together with the inner cover 102 (refer to FIG. 2), and only the detachable grill 101 is then detached (refer to FIG. 3). In the drawings, a reference numeral 103 denotes a cassette tape insertion port.

Figure 3:
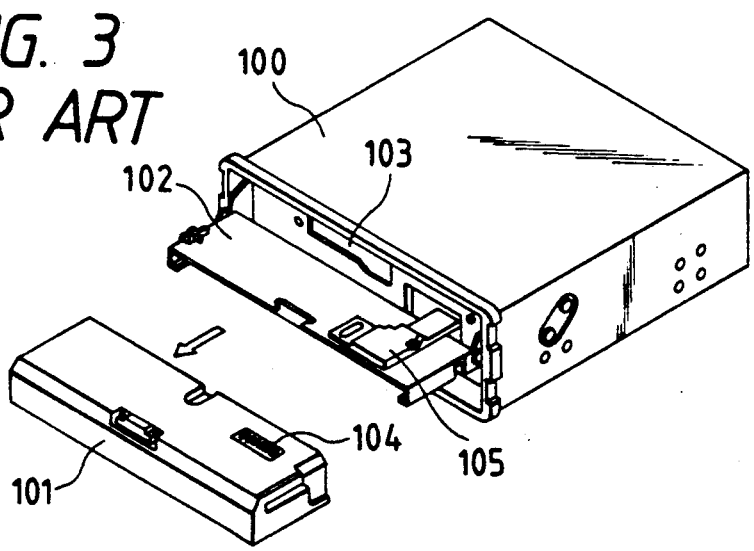
FIG. 3 is a perspective view of a detachable grill which is detached from a body part.

The body part 100 is electrically connected to the detachable grill 101 by using the contact between two contact terminals 104 and 105, as shown in FIG. 3. Each of the contact terminals 104 and 105 has a certain number of signal lines connected thereto.

Figure 4:
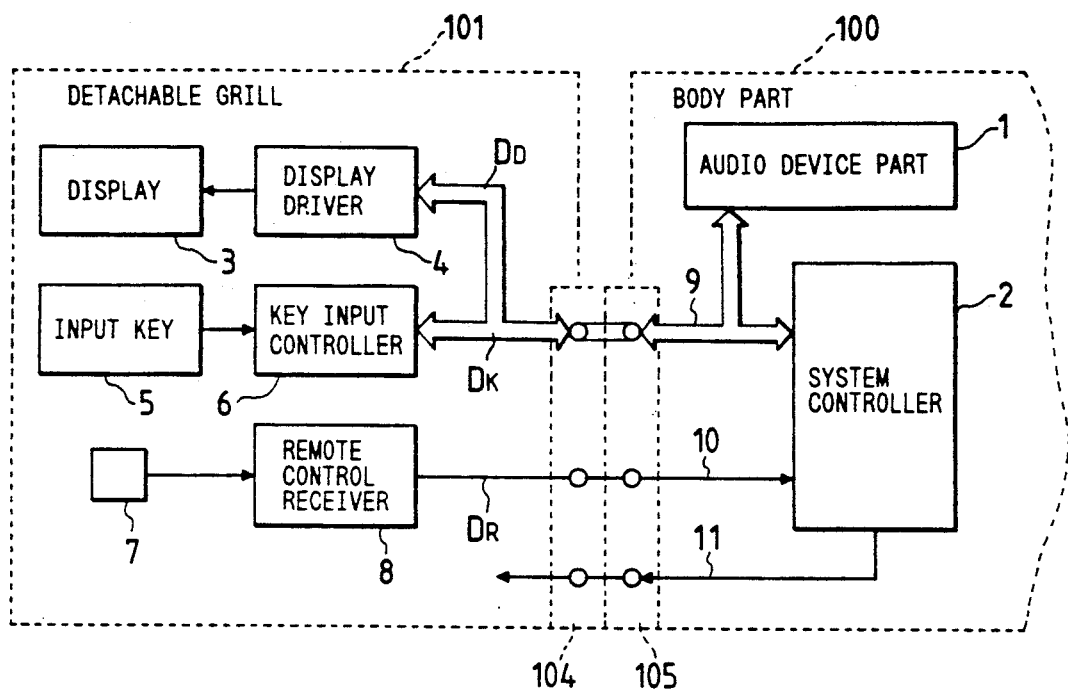
Fig 4 is a block diagram of a principal portion in an electrical system of a detachable car audio device of prior art.

FIG. 4 shows an electrical principal portion in an detachable grill system. The detachable grill 101 comprises a display 3 employing LCD (Liquid Crystal Display) or the like, a display driver 4 for driving the display 3, a single or a plurality of input keys 5 for operation input, a key input controller 6 comprising a microprocessor or the like for outputting the command generated from the input keys 5 to the system controller 2, a light receiver 7 such as a phototransistor for receiving the infrared remote control signal output from a remote controller (not shown) and a remote control receiver 8 having a decoder for decoding the signal receiving thereby.

The body part 100 contains a cassette tape recorder, an audio device part 1 which is related to mechanisms such as the mechanism part of a CD player and the driving motor therefor, and the system controller 2 comprising a microprocessor for generally controlling the whole of the audio device.

The display driver 4 and the key input controller 6 are electrically connected to the system controller 2 through a system bus comprising a plurality of signal lines (for example, 5 signal lines). The audio device part 1 is also connected to the system controller 2 through the system bus 9. The remote control receiver 8 is also connected to the system controller 2 through a signal line 10. In the drawing, a reference numeral 11 denotes a power line for supplying electric power to the side of the detachable grill 101 from the body part 100.

The operation command signal $D_K$ generated by the input keys 5 is decoded by the key input controller 6 and sent to the system controller 2 through the system bus 9. The display signal $D_D$ output from the system controller 2 is sent to the display driver 4 through the system bus 9. In this way, the display 4, the key input controller 6, the system controller 2 and the audio device part 1 hold the system bus 9 in common. The remote control signal $D_R$ received by the remote control receiver 8 is sent to the system controller 2 through the signal line 10.

Figure 5:
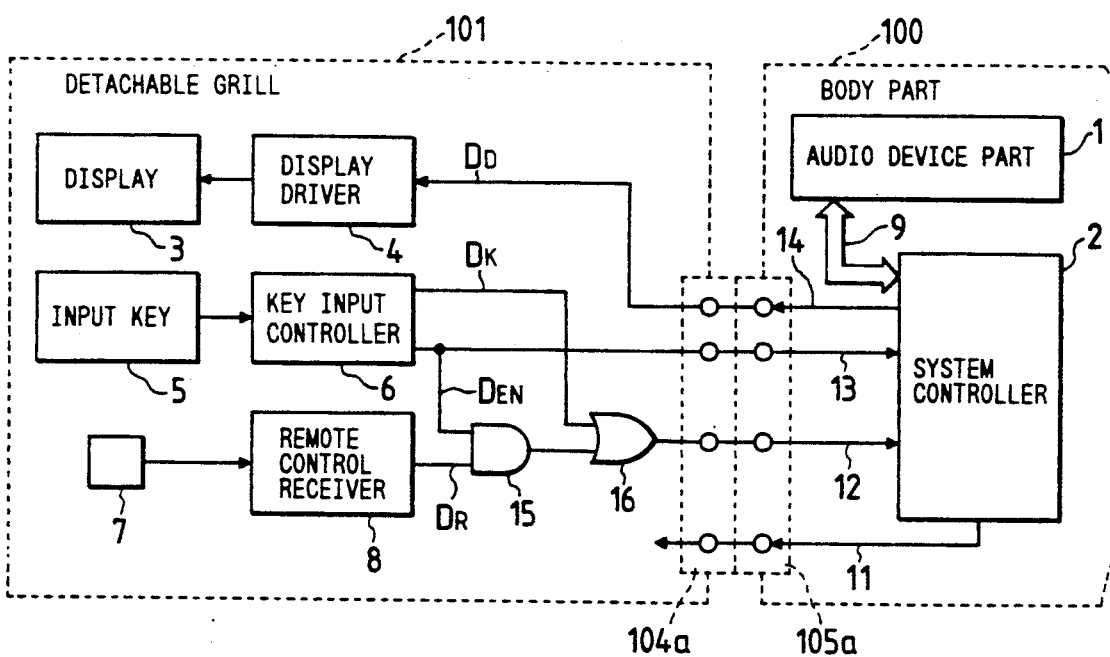
FIG. 5 is a block diagram of a principal portion in an electrical system of a detachable car audio device in accordance with the present invention.

FIG. 5 shows an embodiment of the present invention.

The car audio device shown in FIG. 5 is different from the conventional car audio device shown in FIG. 4 in the point that the operation command signal $D_K$ output from the key input controller 6 and the remote control signal $D_R$ output from the remote control receiver 8 are connected to each other through gate means comprising an AND gate 15 and an OR gate 16 and are connected to the system controller 2 by a single common signal line 12. The car audio device shown in FIG. 5 is also different from that shown in FIG. 4 in the point that the inhibition signal $D_{EN}$ output from the key input controller 6 is input to one terminal of the AND gate 15 and input to the system controller 2 through the signal line 13, and the point that the display signal $D_D$ input to the display driver 4 is transmitted through a single signal line 14 to the display driver. In addition, contact terminals 104a and 105a are contact terminals for connecting and separating the detachable grill 101 with and from the body part 100, respectively, without using the system bus 9 so that the number of terminals can be reduced. The common signal line 12 is used by the key input controller 6 and the remote control receiver 8 in common for transmitting the signals. In a conventional device, the signal lines used for the key input controller 6 and the remote control receiver 8 are separately provided, as shown in FIG. 4.

Figure 6:
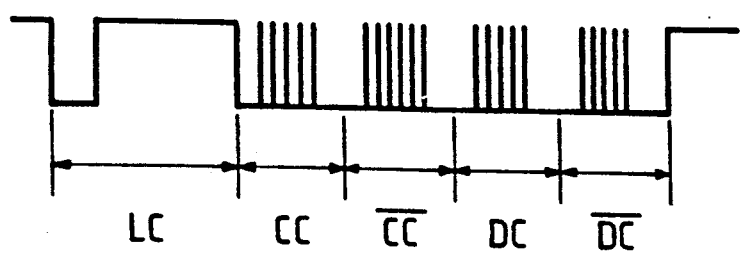
FIG. 6(*a*) is an explanatory view of a signal format of a remote control signal.
Figure 6:
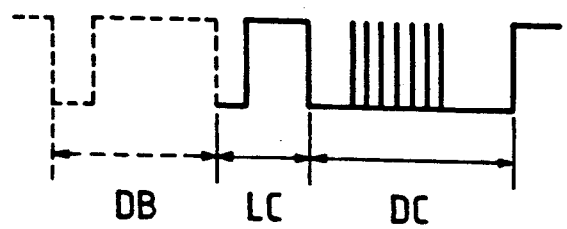

FIG. 6(a) shows a signal format of the remote control signal $D_R$, and FIG. 6(b) shows a signal format of the operation command signal $D_K$ output from the key input controller 6.

As shown in FIG. 6(a), the remote control signal $D_R$ is composed of a leader code LC which indicates the start of transmission, a custom code CC (8 bits) for distinguishing the units to be controlled in the audio device part 1, a reverse code $\overline{CC}$ reverse to the custom code, a data code DC which indicates the content of an operation command, and a reverse code $\overline{DC}$ reverse to the data code DC, which are arranged in time series. In the above codes, the reverse code $\overline{CC}$ and the reverse code $\overline{DC}$ are added to the custom code CC and the data code DC, respectively, in order to check error in the transmission of the signal so as to improve reliability.

As shown in FIG. 6(b), the signal format of the operation command signal $D_K$ is simplified as compared with the remote control signal $D_R$. This is because the operation corresponding to the custom code CC is performed in the body on the basis of the signal from the key input controller 6, and thus the operation command signal $D_K$ need not contain the custom code CC and the reverse code $\overline{CC}$. This is also because little transmission error occurs in the transmission of signals in the body part and thus the operation command signal $D_K$ need not contain the reverse code $\overline{DC}$. As a result, the operation command signal $D_K$ basically comprises the leader code LC and the decoder code only.

However, as the key input controller 6 is generally set in a higher priority level than the remote control receiver 8, when the input key 5 is pushed during remote control transmission, there is a possibility that the key input controller 6 starts to transmit the operation command signal $D_K$.

A dummy bit DB is therefore used for preventing such a phenomenon. The dummy bit DB used has the same signal waveform as that of the leader code LC. When the key input controller 6, which transmits no signal, newly transmits the operation command signal $D_K$, the dummy bit DB is added before the leader code LC (refer to the broken line shown in FIG. 6(b). The dummy bit DB is not recognized as data in the system controller 2 but it is processed as error therein. For example, even if the operation key for remote control is continuously pushed, the processing of remote control input is stopped, and the processing of the key input controller 6 is started. When the key input controller 6 continuously transmits the signal, the dummy bit DB is not added.

The operation of the audio device shown in FIG. 5 is described below.

If an operation command is input from the input key 5, the operation command signal $D_K$ corresponding to the content of the operation input is input to one terminal of the OR gate 16, and the inhibition signal $D_{EN}$ (= "L") is input to one input terminal of the AND gate 15. As a result, the input logical conditions of the AND gate 15 are not satisfied, and the transmission of the remote control signal $D_R$ form the remote control receiver 8 is thus inhibited. The operation command signal $D_K$ is therefore transmitted to the system controller 2 by the signal 12 through the OR gate 16. On the other hand, the display signal $D_D$ output from the system controller 2 is transmitted to the display driver 4 through the signal line 14. The signal line 13 is provided for transmitting the inhibition signal $D_{EN}$ to the system controller 2 so as to match the operation of the AND gate 15 with the operation of the system controller 2.

When no operation input is performed by the input key 5, and when an operation command is given to the remote control receiver 8 through the light receiver 7, the logic of the inhibition signal $D_{EN}$ is "H", and thus the operation of the AND gate 15 is not inhibited, and it is selected by the signal line 13 through the OR gate 16 and then transmitted through the single common signal line 12. Since the system bus is not connected between the detachable grill 101 and the body part 100, it is possible to reduce the number of wirings and prevent the noise produced when the detachable grill is attached and detached from being mixed in the audio device part 1.

In the above-mentioned embodiment, although the inhibition signal $D_{EN}$ is generated from the key input controller 6 because the input controller 6 has a higher level of priority, an embodiment is not limited to this, and the priority of the remote control receiver 8 may be made higher than that of the input controller 6. This can be realized by causing the inhibition signal $D_{EN}$ to be output from the remote control receiver 8 so that the remote control signal $D_K$ is transmitted with priority when the remote control receiver 8 receivers a signal. In both cases, either of the input controller 6 or the remote is selected because both the input controller 6 and the remote control receiver 8 are of the same quality with respect to operation input.

The invention may be embodied is other specific forms without departing from the spirit of essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. In a car audio device comprising a body part having a system controller and an operational part which has a key input controller and a remote control receiver, each for outputting an operation signal to said system controller, said operational part being detachably connected to said body part, the improvement comprising:

gate means, in said operational part, for selectively outputting an operation signal output from either said key input controller or said remote control receiver; and a common transmission line for transmitting a signal output from said gate means in said operational part to said system controller in said body part.

2. A car audio device according to claim 1, wherein said key input controller outputs to said system controller a signal for inhibiting transmission of a remote control signal output from said remote control receiver during processing of a key input operation signal, and said gate means comprises and AND gate which carries out logical AND between said inhibition signal and said remote control signal and an OR gate which carries out logical OR between the operation command signal output from said key input controller and a signal output from said AND gate.

* * * * *